United States Patent
Harlan et al.

[11] Patent Number: 5,713,600
[45] Date of Patent: Feb. 3, 1998

[54] FAILSAFE STABILIZER FOR AIRCRAFT LOADER

[75] Inventors: John S. Harlan, Salinas; Raymond L. Hickman, Gilroy; Bernard T. Lantis, Salinas, all of Calif.

[73] Assignee: Lantis Corporation, Salinas, Calif.

[21] Appl. No.: 371,002

[22] Filed: Jan. 10, 1995

[51] Int. Cl.⁶ ............................................ B60S 9/02
[52] U.S. Cl. ............................ 280/765.1; 280/766.1; 248/354.1
[58] Field of Search .................. 280/763.1, 764.1, 280/765.1, 766.1, 47.131, 47.16, 47.12, 47.2; 414/495; 248/352, 354.1, 354.4, 354.5, 354.6

[56] References Cited

U.S. PATENT DOCUMENTS

| | | | |
|---|---|---|---|
| 2,634,941 | 4/1953 | Eckert | 280/763.1 |
| 3,341,042 | 9/1967 | Carder | 414/495 |
| 3,474,997 | 10/1969 | Hinrichsen | 248/354.6 |
| 3,489,428 | 1/1970 | Hunter et al. | 280/765.1 |
| 4,593,474 | 6/1986 | Mayhew | 280/764.1 |
| 4,662,809 | 5/1987 | Sturtz et al. | 414/495 |
| 4,770,427 | 9/1988 | Howell et al. | 414/495 |
| 4,928,488 | 5/1990 | Hunger | 280/766.1 |
| 5,054,805 | 10/1991 | Hungerink et al. | 280/763.1 |
| 5,188,248 | 2/1993 | Dohnalik | 280/714 |
| 5,201,351 | 4/1993 | Hurdle, Jr. | |
| 5,421,611 | 6/1995 | Peterson et al. | 280/763.1 |
| 5,451,080 | 9/1995 | Kneile | 280/763.1 |

FOREIGN PATENT DOCUMENTS

| | | | |
|---|---|---|---|
| 1038412 | 8/1958 | Germany | 280/766.1 |
| 3603593 | 8/1987 | Germany | 280/766.1 |
| 5-278575 | 10/1993 | Japan | 280/765.1 |

Primary Examiner—Brian L. Johnson
Assistant Examiner—Min Yu
Attorney, Agent, or Firm—Flehr Hohbach Test Albritton & Herbert LLP

[57] ABSTRACT

A failsafe stabilizer for an aircraft loader includes a pair of stabilizers extending from the loader which have a ground engaging plate which is actuated by a piston cylinder combination hydraulically. The cylinder is pivotally mounted to the chassis of the loader and normally maintained in its vertical position by a locking pin which engages a plate extending from the piston. If there is an emergency power failure in the hydraulic system, the pin may be withdrawn and when the loader is towed away, the cylinder and ground engaging plate pivot to remove any load from the plate to allow the loader to be easily moved on its wheels. To insure that the locking pin may be easily removed an offset pivot mounting is provided for the cylinder in the chassis relative to the center line of the cylinder so that there is minimal force on the locking pin even when the stabilizer is extended to contact the ground in its operating position.

4 Claims, 2 Drawing Sheets

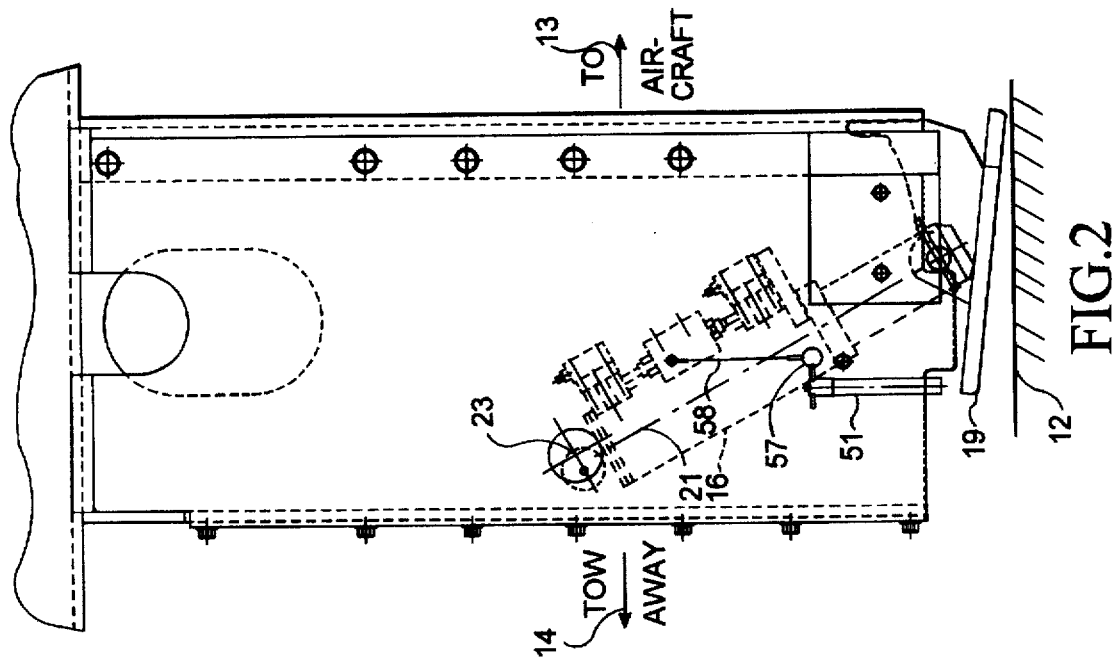
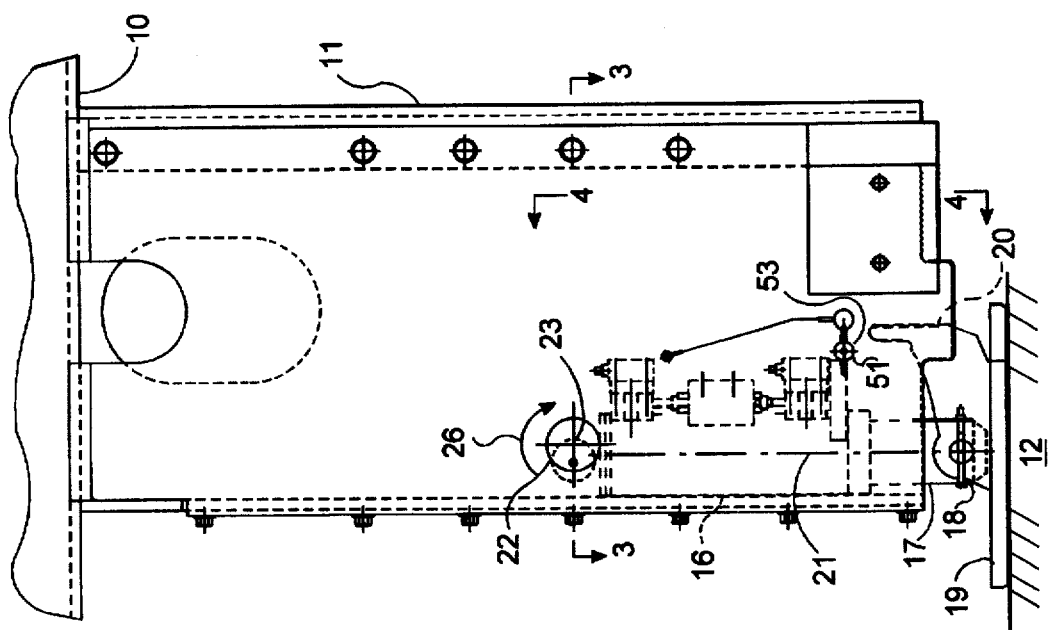

FAILSAFE STABILIZER FOR AIRCRAFT LOADER

The present invention is directed to failsafe stabilizers for aircraft loaders and more specifically to stabilizers which are hydraulically actuated but may be mechanically released.

BACKGROUND OF THE INVENTION

Normally aircraft loaders have stabilizers which are used to prevent excessive loads on the vehicle axles and tires during load/unload operations and in addition to provide a stable lifting platform even when unsymmetrical loads are being accommodated. Such stabilizers as well as the lifting platforms are operated by a hydraulic system or pump which is susceptible to failure. The stabilizers are required to stay fully extended when loaded, and fully up when the mobile loader platform is being moved. It is necessary to install a counterbalance valve for each hydraulic cylinder. This device requires hydraulic pressure to be available in order to unlock and either extend or retract the stabilizers. Thus, to retract the stabilizer, one cannot merely open a valve to cause the stabilizer plate, which is pivoted on the end of the hydraulic piston, to clear the ground. If there is an equipment breakdown, the aircraft cannot be easily moved with the loader next to it. One solution is to provide a battery powered emergency pump in order to retract the stabilizers. But this is ineffective if the battery power is depleted or if one of the hydraulic hoses has ruptured. Another solution is to drag the loader away risking damage to both the equipment and paving.

OBJECT AND SUMMARY OF THE INVENTION

The object of the present invention is to provide a failsafe stabilizer for an aircraft loader. In accordance with the above object there is provided an aircraft loader mounted on a mobile chassis for docking with an aircraft and having at least a pair of stabilizers extendable to the ground from the chassis for stabilizing the loader when docked at the aircraft. Each of the stabilizers comprise hydraulic actuator means including a cylinder pivotally mounted to the chassis at a predetermined pivot axis at one end and having a piston extending from the cylinder at the other end carrying a pivotally mounted ground-engaging plate. Removable locking pin means, normally fixed in position by the chassis engage the cylinder for preventing the cylinder from pivoting about the pivot axis, at least in one direction but when removed allows rotating around the pivoting axis in a predetermined direction whereby the plate is removed from the ground even though the piston has been extended to engage the ground.

DESCRIPTION OF THE DRAWINGS

FIG. 1 a side elevational view of one of the stabilizers of an aircraft loader which has been extended to the ground.

FIG. 2 is a side elevational view similar to FIG. 1 showing the failsafe condition of the stabilizer plate which has been rotated away from the ground.

BRIEF DESCRIPTION OF THE PREFERRED EMBODIMENT

Figure 3:
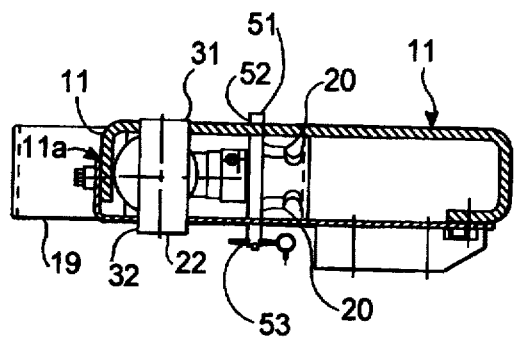
FIG. 3 is a simplified cross-sectional view taken along the line 3—3 of FIG. 1.

The chassis 10 of a portion of an aircraft loader is illustrated in FIG. 1 which has a downward extending chassis leg 11 of rectangular configuration (see FIG. 3) to the ground 12. Leg 11 is one of a pair of stabilizer legs which are used when the loader, which typically has a pair of elevatable platforms is loading through the elevated door of an aircraft parked adjacent to it. In fact, referring to FIG. 2, the arrow 13 illustrates the normal location of the aircraft. And then the opposite arrow 14 designated "Tow Away" indicates the movement that the mobile aircraft loader must take to back away from the loading door of the aircraft.

Referring back to FIG. 1 the chassis leg 11 includes a stabilizer which has a cylinder 16 and extendable piston 17 which is shown in its extended position. Pivotally mounted at the axis 18 on the end of piston 17 is a ground engaging plate 19. On plate 19 are a pair of fingers 20 which extend into slots (not shown) in chassis leg 11 to assure that there is no rotation around the common central axis 21 of the cylinder and piston 16, 17.

Cylinder 16 at its upper end includes a cylindrical shaft 22 which is permanently attached to the cylinder 16 and which allows the cylinder to pivot about a pivot axis 23. This is shown more clearly in FIG. 5 which also illustrates the offset of the pivot axis 23 of shaft 22 from the commons central axis 21 of the cylinder 16 and piston 17; this offset is designated 24. When the piston 17 is extended to the ground and a resultant force placed on the piston cylinder 16, 17, such offset 24 will tend to rotate (or bias) cylinder 16 around its pivot axis 23 in the direction shown by the arrow 26. Shaft 22 as illustrated in FIG. 4, extends beyond the edges of the cylinder 16 so that, as illustrated in FIG. 3, it may be pivoted on the walls of the chassis 11 by means of the cutouts 31 and 32 which serve as bearings.

Figure 4:
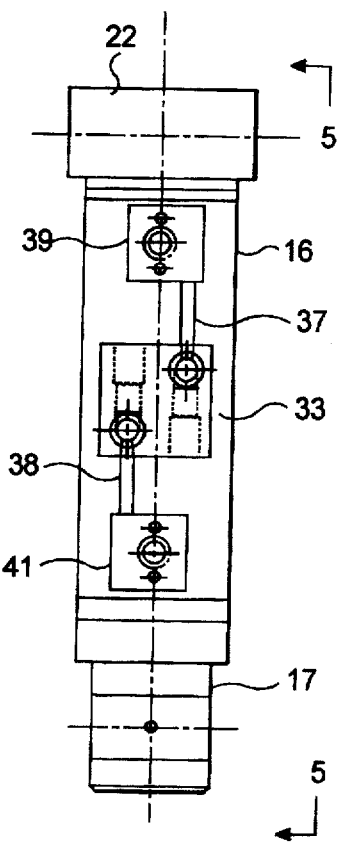
FIG. 4 is a enlarged side elevational view taken substantially along the line 4—4 of FIG. 1 but simplified to show only the cylinder and piston and with the piston in its fully retracted condition.
Figure 5:
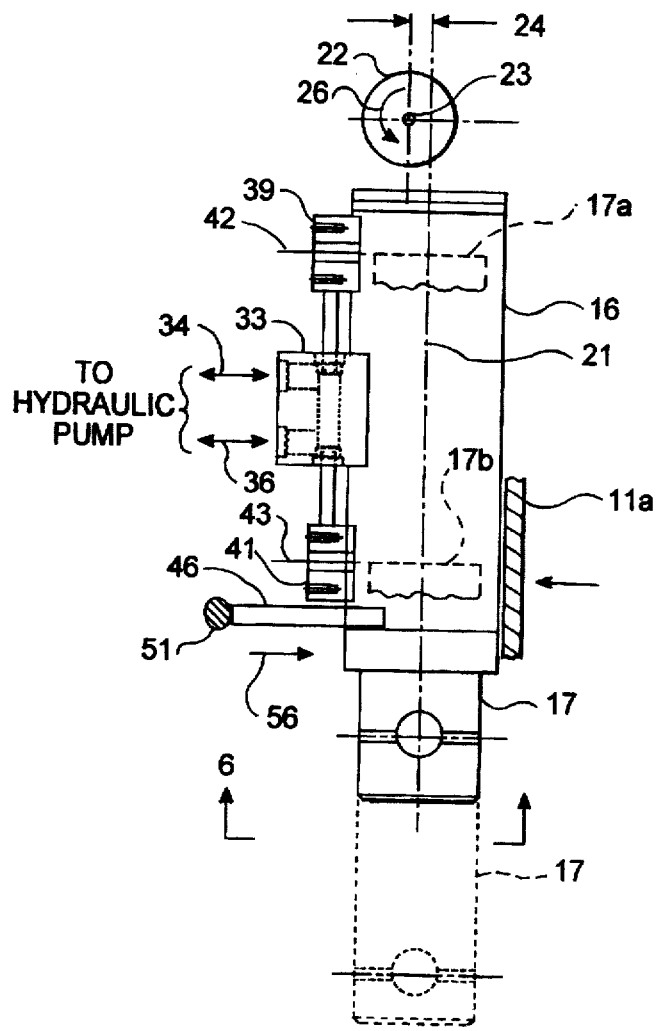
FIG. 5 is a side elevational view substantially taken along the line 5—5 of FIG. 4.

In general and referring to both FIGS. 4 and 5, the cylinder and piston from a hydraulic standpoint operate in a very normal manner. The hydraulic system includes a counterbalance valve 33 which has the ports 34 and 36 which are coupled to a hydraulic pump which are utilized for the extension and retraction of piston 17. The two ports of the counterbalance valve are connected by the pipes 37 and 38 to upper and lower inlet blocks 39 and 41 which include inlets into the top and bottom portions of cylinder 16 and provide a path for the actuating hydraulic fluid. Such counterbalance valve, as discussed above, requires hydraulic pressure for actuation as a safety measure. Equivalent units such as a pilot operated check valve may also be used. Piston 17 in its retracted position is shown at 17a with the top of the piston near the upper hydraulic coupling 39 and in its fully extended position at 17b with the top of the piston near the lower hydraulic coupling 41.

Each input block 39 and 41 includes a proximity switch sensor 42 and 43 which senses the proximity of the top of the cylinder; thus, these indicate a fully retracted or fully extended piston. These proximity switches provide a very reliable indication of the operation of the stabilizer. FIG. 5 in the dashed outline 17 shows the fully extended position.

Figure 6:
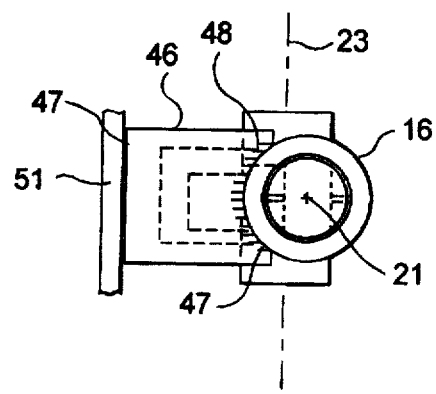
FIG. 6 is a simplified bottom view substantially taken along the line 6—6 of FIG. 5.

In order to maintain the pivoted cylinder 16 in a vertical position for performing its stabilizing function (since otherwise it is freely pivoted at pivot axis 23), as illustrated in FIG. 6 there is affixed to the lower portion of cylinder 16 a plate 46 having a semicircular cutout 47 which mates with cylinder 16. A solid connection is made as indicated by the welding 48. A locking pin 51 engages an edge 47 of plate 46 opposite the cutout 48 to normally maintain the cylinder 16 and its piston 17 in a vertical position.

As illustrated in FIG. 3, pin 51 extends through the walls of chassis 11 at the points 52 and 53. Pin 51 effectively engages the cylinder to prevent it from pivoting above the pivot axis 23 at least in one direction. And this direction is a forward direction which is toward the aircraft as shown by the arrow 13 (FIG. 2). W en the pin is pulled, cylinder 16 is allowed to pivot toward the aircraft which, in turn, allows the aircraft loader to be towed away in the direction 14.

Cylinder 16 is restrained in the other direction in a vertical position by a wall portion 11a of the chassis 11 as shown in FIG. 3. (And also as shown in FIG. 5).

Moreover, the offset 24 as shown in FIG. 5 tends to bias the cylinder 16 and piston 17 in a direction toward wall portion 11a and away from the pin 51 as shown by the arrow 56. Thus this means that in a normal extended operating position of the stabilizer, there will be no force on the pin 51 so it can be easily removed, and this is accomplished, as shown in FIGS. 1 and 2, by pulling on the ring 57 (see FIG. 2) and allowing the pin 51 to hang by the attachment wire 58 from the chassis 11. When this is done, the cylinder piston is free to pivot to allow stabilizer plate 19 to be moved from the ground while the loader is being towed away in the direction 14.

Thus, in summary, in operation if there is a power failure in the hydraulic system or a rupture of a hose, it is possible to pull out the pins on both of the pair of forward stabilizers, hook up a tow tractor and pull the loader backward away from the airplane. The stabilizers will rotate forward as shown in FIG. 2, letting the loader down onto the wheels so it may be easily moved. This prevents unnecessary delays to the aircraft departure because of a loader being stranded next to an aircraft. The stabilizer pads are merely dragged along the pavement with no load on them. Once the loader is repaired the pins are again engaged and the stabilizer operation is back to normal. Thus a failsafe stabilizer is provided for an aircraft loader.

What is claimed is:

1. In an aircraft loader mounted on a mobile chassis for docking with the aircraft and having at least a pair of stabilizers extendable to the ground from the chassis for stabilizing the loader when docked at the aircraft, each of said stabilizers comprising:

hydraulic actuator means including a cylinder pivotally mounted to said chassis, having a path of movement in a vertical plane perpendicular to said ground, at a predetermined pivot axis at one end and having a piston extending from the cylinder at the other end carrying a pivotally mounted ground-engaging plate which normally engages said ground when said cylinder is in a vertical position and said piston is extended;

removable locking pin means normally fixed in position by said chassis across said path of movement for preventing such cylinder from pivoting about said pivot axis out of said vertical position in one direction, but when removed from said path of movement allowing rotation around said pivot axis in said one direction in said path of movement whereby said plate is disengaged from the ground even though said piston has been extended to engage said ground;

said cylinder and piston having a common central axis which is offset from said pivot axis, said offset biasing said cylinder and piston to rotate on said pivot axis in a direction away from said locking pin means against a wall of said chassis in said vertical position, opposite said one direction when said plate is extended to the ground and to allow said locking pin means to be freely removed whereby said hydraulic actuator means may be manually pivoted in said one direction to allow disengagement of said plate from said ground;

said hydraulic actuator means also including valve means for requiring hydraulic pressure to retract an extended piston as well as to extend said piston.

2. In an aircraft loader as in claim 1 including a plate with a semicircular cutout affixed to said cylinder having an opposite edge against which said locking pin means abuts.

3. In an aircraft loader as in claim 1 including a pair of proximity switch means mounted on said cylinder for sensing the fully extended and retracted positions of said piston and cylinder.

4. In an aircraft loader as in claim 3 where said valve means is a counterbalance valve.

* * * * *